(12) United States Patent
Meerveld et al.

(10) Patent No.: US 10,337,123 B2
(45) Date of Patent: *Jul. 2, 2019

(54) FLASH SPUN PLEXIFILAMENTARY STRANDS AND SHEETS

(71) Applicant: E I DU PONT DE NEMOURS AND COMPANY, Wilmington, DE (US)

(72) Inventors: Jan Van Meerveld, Remich (LU); Corneille Schmitz, Aywaille (BE); Joseph Mathieu, Esch-sur-Alzette (LU); Noel Stephen Brabbs, Garnich (LU); Orest Skoplyak, Newark, DE (US); Christine Lemoine, Waldbredimus (LU); Serge Rebouillat, Echenevex (FR)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 139 days.

This patent is subject to a terminal disclaimer.

(21) Appl. No.: 15/007,378

(22) Filed: Jan. 27, 2016

(65) Prior Publication Data

US 2016/0138197 A1    May 19, 2016

Related U.S. Application Data

(63) Continuation-in-part of application No. 14/796,350, filed on Jul. 10, 2015.

(51) Int. Cl.
*D01F 6/04*     (2006.01)
*D04H 13/00*    (2006.01)
(Continued)

(52) U.S. Cl.
CPC ............ *D01F 6/04* (2013.01); *B32B 5/022* (2013.01); *B32B 5/26* (2013.01); *D01D 5/11* (2013.01);
(Continued)

(58) Field of Classification Search
CPC . D04H 1/74; D04H 1/724; D01D 5/11; D01F 6/04; D10B 3221/021
See application file for complete search history.

(56) References Cited

U.S. PATENT DOCUMENTS

| 3,081,519 A | 3/1963 | Blades et al. |
| 3,169,899 A * | 2/1965 | Steuber ................. C04B 40/04 156/62.2 |

(Continued)

FOREIGN PATENT DOCUMENTS

| GB | 1333059 A | 10/1973 |
| WO | 0129295 A1 | 4/2001 |

(Continued)

OTHER PUBLICATIONS

Aggarwal, S.L., Tilley, G.P., "Determination of crystallinity in polyethylene by X-Ray diffractometer", Journal of Polymer Science, vol. 18, pp. 17-26, 1955.
(Continued)

*Primary Examiner* — Scott R. Walshon

(57) ABSTRACT

A flash-spun plexifilamentary fiber strand having a BET surface area of less than 12 m²/g, a crush value of at least 0.9 mm/g wherein said fiber strand comprises predominantly fibers formed from polyethylene, said fibers having a total crystallinity index of less than 55%, said fiber strand having an elongation at break greater than 55% and sheets made thereof.

3 Claims, 5 Drawing Sheets

(51) Int. Cl.
*B32B 5/26* (2006.01)
*B32B 5/02* (2006.01)
*D04H 1/724* (2012.01)
*D01D 5/11* (2006.01)

(52) U.S. Cl.
CPC ............ *D04H 1/724* (2013.01); *D04H 13/00* (2013.01); *B32B 2262/0253* (2013.01); *B32B 2437/00* (2013.01); *B32B 2571/00* (2013.01)

(56) References Cited

U.S. PATENT DOCUMENTS

| | | | |
|---|---|---|---|
| 3,227,794 A | | 1/1966 | Anderson et al. |
| 3,346,682 A | * | 10/1967 | Thomson ........... B01D 39/1623 264/119 |
| 3,427,376 A | | 2/1969 | Dempsey |
| 3,478,141 A | | 11/1969 | Dempsey et al. |
| 3,532,589 A | | 10/1970 | David |
| 3,655,498 A | * | 4/1972 | Woodell ................. D01D 5/11 264/205 |
| 3,860,369 A | | 1/1975 | Brethauer et al. |
| 5,147,586 A | | 9/1992 | Shin et al. |
| 5,560,974 A | | 10/1996 | Langley |
| 5,672,307 A | * | 9/1997 | Shin ......................... D01D 5/11 264/205 |
| 5,786,284 A | | 7/1998 | Matsuoka et al. |
| 5,964,742 A | | 10/1999 | McCormack et al. |
| 5,972,147 A | | 10/1999 | Janis |
| 5,985,196 A | * | 11/1999 | Shin ......................... D01D 5/11 264/205 |
| 6,096,421 A | | 8/2000 | Waggoner et al. |
| 6,610,390 B1 | | 8/2003 | Kauschke et al. |
| 7,179,413 B1 | | 2/2007 | Shin et al. |
| 7,744,989 B2 | | 6/2010 | Marin et al. |
| 8,048,513 B2 | * | 11/2011 | Marin ...................... D01D 5/11 264/171.21 |
| 9,194,065 B2 | * | 11/2015 | Moore ................. D04H 1/4291 |
| 2003/0032355 A1 | | 2/2003 | Guckert et al. |
| 2004/0241399 A1 | | 12/2004 | Marmon et al. |
| 2011/0151737 A1 | * | 6/2011 | Moore ................. D04H 1/4291 442/334 |
| 2014/0000007 A1 | * | 1/2014 | Fukushima ............. D06P 3/794 2/167 |

FOREIGN PATENT DOCUMENTS

| | | |
|---|---|---|
| WO | 03076483 A2 | 9/2003 |
| WO | 2012117596 A1 | 9/2012 |
| WO | WO-2012117596 A1 * | 9/2012 ............. D06P 3/794 |

OTHER PUBLICATIONS

Brunauer, S., Emmett, P.H. and Teller, E., "Adsorption of Gases in Multimolecular Layers"., Journal of the American Chemican Society, vol. 60:309-319 (1938).

International Search Report dated Oct. 28, 2015, for International Application No. PCT/US2015/036379, filed Jun. 18, 2015.

PCT International Search Report, dated Oct. 28, 2015, for International Application No. PCT/US2015/040566, filed Jul. 15, 2015, ISA/European Patent Office; Jo Verschuren, Authorized Officer.

* cited by examiner

FLASH SPUN PLEXIFILAMENTARY STRANDS AND SHEETS

FIELD OF THE INVENTION

This invention relates to flash-spun plexifilamentary sheets, fabrics, or fiber webs suited for protective apparel, air filtration, and other end use applications.

BACKGROUND OF THE INVENTION

Protective apparel includes coveralls, gowns, smocks and other garments whose purpose is either to protect a wearer against exposure to something in the wearer's surroundings, or to protect the wearer's surroundings against being contaminated by the wearer. Examples of protective apparel include suits worn in microelectronics manufacturing cleanrooms, medical suits and gowns, dirty job coveralls, and suits worn for protection against liquids or particulates. The particular applications for which a protective garment is suitable depends upon the composition of the fabric or sheet material used to make the garment and the way that the pieces of fabric or sheet material are held together in the garment. For example, one type of fabric or sheet material may be excellent for use in hazardous chemical protection garments, while being too expensive or uncomfortable for use in medical garments. Another material may be lightweight and breathable enough for use in clean room suits, but not be durable enough for dirty job applications.

The physical properties of a fabric or sheet material determine the protective apparel applications for which the material is suited. It has been found desirable for a wide variety of protective garment applications that the material used in making the protective garment provide good barrier protection against liquids such as body fluids, paints or sprays. It is also desirable that the material used in making protective apparel block the passage of fine dirt, dust and fiber particles. Another group of desirable properties for fabrics or sheet materials used in protective apparel is that the material have enough strength and tear resistance that apparel made using the sheet material not lose its integrity under anticipated working conditions. It is also important that fabrics and sheet materials used in protective garments transmit and dissipate both moisture and heat so as to permit a wearer to perform physical work while dressed in the garment without becoming excessively hot and sweaty. Finally, most protective garment materials must have a resilience that allows them to recover their shape when crushed or otherwise distorted. Recovery after crush is a measurement often used for resiliency. In the context of the present invention, resiliency includes both elastic and plastic deformation as long as the material substantially recovers its original shape and essential properties after the stress gradient that is the cause of the crush has been removed.

Bonding of fabrics to form garments may require fusion of the fabric material with other materials. Such fusion is easier with a material that has a reduced crystalline structure. What is needed therefore is a fabric with a high resilience, as evidenced by crush value, and a lower crystallinity than heretofore available so that bonding with other layers is enhanced. There are multiple situations where the deformation can occur while positioning or using the material of interest. It is then desirable that the material recovers its original shape and essential properties.

SUMMARY OF THE INVENTION

In one embodiment the present invention is directed to a flash-spun plexifilamentary fiber strand having a total crystallinity index of less than or equal to 55%.

In a further embodiment the fiber strand has a BET surface area of less than 12 $m^2/g$, a crush value of greater than or equal to 0.9 mm/g. In a still further embodiment the fiber strand comprises predominantly fibers formed from polyethylene.

In a still further embodiment the fiber strand comprises predominantly fibers formed from polyethylene said fibers having a total crystallinity index of less than 52%.

The fiber strand of the invention may further have a monoclinic and orthorhombic structure as determined by an X-ray analysis as described herein, and a crystallinity index of the monoclinic structures is equal or higher than 1%.

In a further embodiment the fiber strand of the invention has an elongation at break of 55% or greater.

In a further embodiment, any of the embodiments disclosed here of plexifilamentary fiber strands may be consolidated into a sheet structure. This sheet structure may then be optionally thermally or mechanically bonded.

In a still further embodiment, the invention is directed to a multilayer structure comprising a multiplicity of two or more consolidated sheets.

A multilayered structure of the invention may further comprise a multiplicity of two or more sheets wherein at least one sheet is a polyethylene sheet comprising the plexifilamentary structure of any of the embodiments described herein. For example, the plexifilamentary structure may be a consolidated sheet made of a fiber strand according to any of the embodiments described herein. In a further embodiment, the plexifilamentary sheet or sheets may be thermally consolidated.

DETAILED DESCRIPTION

Figure 1:
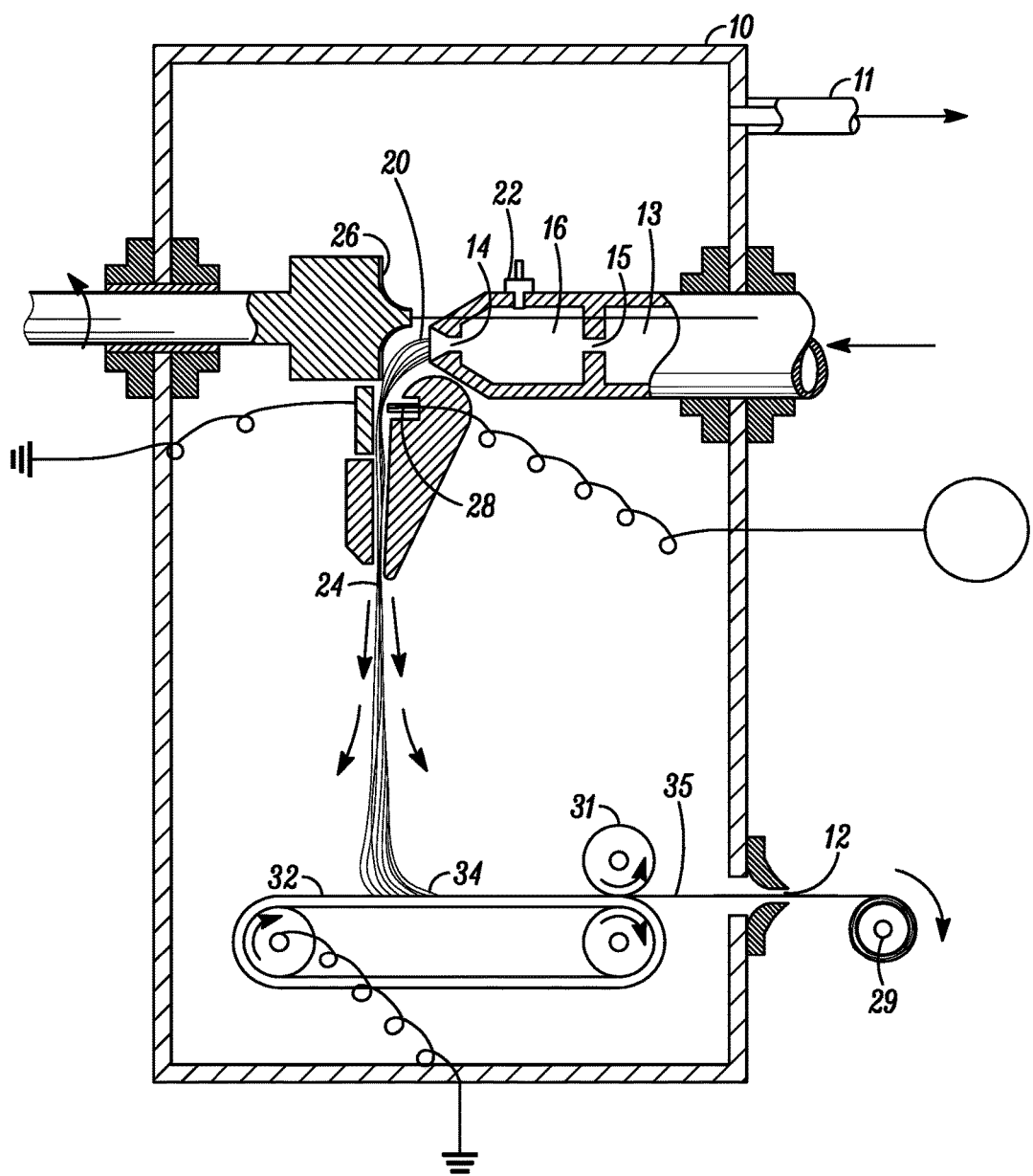
FIG. 1 shows a schematic, not to scale, cross sectional view of a spin cell illustrating a process for making flash-spun plexifilamentary sheets.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "polymer" as used herein, generally includes but is not limited to, homopolymers, copolymers (such as for example, block, graft, random and alternating copolymers), terpolymers, etc. and blends and modifications thereof.

Furthermore, unless otherwise specifically limited, the term "polymer" shall include all possible geometrical configurations of the material. These configurations include, but are not limited to isotactic, syndiotactic and random symmetries.

The term "polyethylene" as used herein is intended to encompass not only homopolymers of ethylene, but also copolymers wherein at least 85% of the recurring units are ethylene units.

The term "nonwoven fabric, sheet or web" as used herein means a structure of individual fibers or threads that are positioned in a random manner to form a planar material without an identifiable pattern, such a pattern, for example, as would be seen in a knitted fabric. Individual fibers that may organize themselves locally in some preferential ways or directions are still considered as positioned in a random manner for the purposes of this definition.

As used herein, the "machine direction" is the long direction within the plane of a sheet, i.e., the direction in which the sheet is produced. The "cross direction" is the direction within the plane of the sheet that is perpendicular to the machine direction.

The term "plexifilamentary" as used herein, means a three-dimensional integral network of a multitude of thin, ribbon-like, film-fibril elements of random length and with a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "spin fluid" refers to the total composition that is spun using the spinning apparatus described herein. Spin fluid includes polymer and spin agent.

The term "spin agent" refers to the solvent or mixture of solvents and any additives, solubility aids and blends therewith that is used to initially dissolve the polymer to form the spin fluid.

By "multilayered structure" is meant a composite structure that contains layers of distinct materials layered and optionally bonded in a face to face arrangement over at least a portion of their faces. In one embodiment the multilayered structure of the invention is directed to a multiplicity of two or more sheets wherein at least one sheet is a polyethylene sheet comprising any plexifilamentary structure as described herein.

EMBODIMENTS OF THE INVENTION

In one embodiment the present invention is directed to a flash-spun plexifilamentary fiber strand having a total crystallinity index of less than or equal to 55%.

In a further embodiment the fiber strand has a BET surface area of less than 12 m$^2$/g, a crush value of greater than or equal to 0.9 mm/g. In a still further embodiment the fiber strand comprises predominantly fibers formed from polyethylene.

In a still further embodiment the fiber strand comprises predominantly fibers formed from polyethylene said fibers having a total crystallinity index of less than 52%.

The fiber strand of the invention may further have a monoclinic and orthorhombic structure as determined by an X-ray analysis as described herein, and a crystallinity index of the monoclinic structures is equal or higher than 1%.

In a further embodiment the fiber strand of the invention has an elongation at break of 55% or greater.

In a further embodiment, any of the embodiments disclosed here of plexifilamentary fiber strands may be consolidated into a sheet structure. This sheet structure may then be optionally thermally or mechanically bonded.

In a still further embodiment, the invention is directed to a multilayer structure comprising a multiplicity of two or more consolidated sheets.

A multilayered structure of the invention may further comprise a multiplicity of two or more sheets wherein at least one sheet is a polyethylene sheet comprising the plexifilamentary structure of any of the embodiments described herein. For example, the plexifilamentary structure may be a consolidated sheet made of a fiber strand according to any of the embodiments described herein. In a further embodiment, the plexifilamentary sheet or sheets may be thermally consolidated.

The process for making flash-spun plexifilamentary sheets, and specifically Tyvek® spunbonded olefin sheet material, was first described in U.S. Pat. No. 3,081,519 to Blades et al. (assigned to DuPont.) The '519 patent describes a process wherein a solution of fiber-forming polymer in a liquid spin agent that is not a solvent for the polymer below the liquid's normal boiling point, at a temperature above the normal boiling point of the liquid, and at autogenous pressure or greater, is spun into a zone of lower temperature and substantially lower pressure to generate plexifilamentary film-fibril strands. As disclosed in U.S. Pat. No. 3,227,794 to Anderson et al. (assigned to DuPont), plexifilamentary film-fibril strands are best obtained using the process disclosed in Blades et al. when the pressure of the polymer and spin agent solution is reduced slightly in a letdown chamber just prior to flash-spinning.

The general flash-spinning apparatus chosen for illustration of the present invention is similar to that disclosed in U.S. Pat. No. 3,860,369 to Brethauer et al., which is hereby incorporated by reference. A system and process for flash-spinning a fiber-forming polymer is fully described in U.S. Pat. No. 3,860,369, and is shown in FIG. 1. The flash-spinning process is normally conducted in a chamber 10, sometimes referred to as a spin cell, which has a spin agent removal port 11 and an opening 12 through which nonwoven sheet material produced in the process is removed. A spin fluid, comprising a mixture of polymer and spin agent, is provided through a pressurized supply conduit 13 to a spinning orifice 14. The spin fluid passes from supply conduit 13 to a chamber 16 through a chamber opening 15. In certain spinning applications, chamber 16 may act as a pressure letdown chamber wherein a reduction in pressure causes phase separation of the spin fluid, as is disclosed in U.S. Pat. No. 3,227,794 to Anderson et al. A pressure sensor 22 may be provided for monitoring the pressure in the chamber 16.

The spin fluid in chamber 16 next passes through spin orifice 14. It is believed that passage of the pressurized polymer and spin agent from the chamber 16 into the spin orifice generates an extensional flow near the approach of the orifice that helps to orient the polymer. When polymer and spin agent discharge from the orifice, the spin agent rapidly expands as a gas and leaves behind a fiber strand of fibrillated plexifilamentary film-fibrils. The gas exits the chamber 10 through the port 11. Preferably, the gaseous spin agent is condensed for reuse in the spin fluid.

The fiber strand 20 discharged from the spin orifice 14 is conventionally directed against a rotating deflector baffle 26. The rotating baffle 26 spreads the strand 20 into a more planar structure 24 that the baffle alternately directs to the left and right. As the spread fiber strand descends from the baffle, the fiber strand is electrostatically charged 28 so as to hold the fiber strand in a spread open configuration until the fiber strand 24 reaches a moving belt 32. The fiber strand 24 deposits on the belt 32 to form a batt 34. The belt is grounded to help ensure proper pinning of the charged fiber strand 24 on the belt. The fibrous batt 34 may be passed under a roller 31 that compresses the batt into a lightly consolidated sheet 35 formed with plexifilamentary film-fibril networks oriented in an overlapping multi-directional configuration. The sheet 35 exits the spin chamber 10 through the outlet 12 before being collected on a sheet collection roll 29.

A "thermally consolidated" or "thermally bonded" sheet is a sheet made by thermal consolidation of a web of the invention. Some examples of thermal bonding processes are through gas bonding, steam entanglement, ultra-sonic bonding, stretched bonding, hot calendaring, hot roll embossing, hot surface bonding.

Thermal surface bonding can be performed by a process as described in U.S. Pat. No. 3,532,589 to David for hard bonded surfaces. In this process the plexifilamentary sheet passes subsequently over a heated drum-cooling drum-heating drum-cooling drum to thermally bond both sides of the material. The heating drum is kept at a temperature that would result in partial melting of the plexifilamentary structure to include the bonding of the sheet. The cooling drum has the purpose to reduce the temperature to a value where the sheet will not shrink nor distort when unrestrained. During the bonding process the sheet is slightly compressed by a flexible belt to have a controlled shrinkage.

Alternatively, the plexifilamentary sheet may be bonded by means of embossing rolls and rubber coated back-up roll to bond one or two sides of the sheet. The embossing roll can be smooth or contain different patterns, for example, but not limited to those shown in the following references, namely a point pattern (U.S. Pat. Nos. 3,478,141, 6,610,390 US 2004/241399 A1), a rib pattern (US2003/0032355 A1), a random pattern (U.S. Pat. No. 7,744,989) or different patterns (U.S. Pat. No. 5,964,742). The sheet may pass through one or multiple stations of an embossing roll with rubber coated back-up roll. In addition, before and after the pairs of embossing and back-up rolls the sheet may be in contact with pre-heat or cooling rolls as described in U.S. Pat. No. 5,972,147. Finally, the bonding process the material may be softened, for example, a button breaking device as described in U.S. Pat. No. 3,427,376 by Dempsey.

EXAMPLES

Test Methods

In the description, examples, and claims, the following test methods were employed to determine various reported characteristics and properties.

The surface area of the plexifilamentary fiber strand product is a measure of the degree and fineness of fibrillation of the flash-spun product. Surface area is measured by the BET nitrogen absorption method of S. Brunauer, P. H. Emmett and E. Teller, J. Am. Chem. Soc., V. 60 p 309-319 (1938) and is reported as square meter per gram ($m^2/g$).

Crush values represent the ability of the fiber strand to recover its initial shape after having been compressed. They were determined using the following procedure: Three plexifilamentary fiber strands of different sizes were pulled from a Reemay® sheet. The three samples weighed about one, two and three grams. The reported crush values are the averages of the values measured on the three samples. Each sample plexifilamentary strand was formed into a ball shape with minimum application of pressure to avoid crushing and the sample was then weighed in grams. A crush tester comprised of an acrylic sample holder and crusher was used to measure the crush value of each sample. The sample holder comprised a cylindrical section having an inner diameter of 2.22 inches (5.64 cm) and an outer, diameter of 2.72 inches (6.91 cm). The center of the cylinder was located at the geometric center of a square base measuring 6.00 inches by 6.00 inches (15.24 cm by 15.24 cm). The crusher comprised a cylindrical plunger rod (diameter=0.75 inches (1.91 cm)) having a first disk-shaped face (the disk having a thickness of 0.25 inches (0.64 cm) and a diameter of 2.20 inches (5.59 cm)) located at one end of the plunger rod and a second disk on the plunger rod spaced back 1.50 inches (3.81 cm) from the first disk. The second disk also had a thickness of 0.25 inches (0.64 cm) and a diameter of 2.20 inches (5.59 cm). The disks were sized slightly smaller than the inner diameter of the cylindrical sample holder in order to allow air to escape from the sample during crushing. The plexifilamentary samples were placed, one at a time, in the sample holder and a thin piece of paper having a diameter of about 2.2 inches (5.59 cm) was placed on top of the plexifilamentary sample prior to crushing. The plunger rod was then inserted into the cylindrical sample holder such that the first disk-shaped face contacted the piece of paper. The second disk served to maintain the axis of the plunger rod in alignment with the axis of the cylindrical sample holder. Each plexifilamentary strand sample was crushed by placing a 2 lb (0.91 kg) weight on the plunger rod. The crush height (mm) was obtained by measuring the height of the sample from the bottom of the cylindrical sample holder to the bottom of the crusher. The plunger and weight were removed from the sample after approximately 2 minutes, leaving the piece of paper in place to facilitate measurement of the restored height of the sample. Each sample was allowed to recover approximately 2 minutes and the restored height (mm) of the sample was obtained by measuring the height of the paper from the center of each of the four sides of the sample holder and averaging the measurements. The crush value (mm/g) is calculated by subtracting the average crush height from the average restored height and dividing by the average of the weights of the samples. The crush value is a measure of how much the sample recovers its original size after being crushed, with higher values indicating greater recovery of original sample height.

Elongation at Break

A 1.5 meter long plexifilamentary fiber strand was taken for conditioning. Conditioning is carried out by the following process; a weight of 20-100 gram was hung on one end of the fiber strand for 3 minutes to remove bends and waviness in the fiber strand and align the fibrils in the direction of force. The weight that was hung on the fiber strand was selected as high as possible without breaking the unconditioned fiber strand. During these 3 minutes the length of fiber strand increases. Subsequently, the conditioned fiber strand was cut into pieces of 30 cm length.

The mass of the individual pieces of 30 cm length was weighted using a microbalance with 0.1 milligram readability (Sartorius, LA 310S, 37075, Goettingen, Germany). The denier was subsequently determined used the following equation:

$$\text{denier[gram]} = \text{mass[gram]} \times \frac{9000 \; m}{0.3 \; m} = 30,000 \times \text{mass[gram]}$$

The 30 cm sample is subsequently placed into a twister (Equiptex, Bronte Works Sapgate Lane, Thornton, Bradford, BD13 3HD, United Kingdom). Under the presence of the same weight as during conditioning, 10 twists per inch are applied. While keeping the sample twisted and manually under tension to prevent it from curling—the sample is placed inside the clamps of the tensile tester.

Tensile measurements were performed in a conditioned laboratory with a temperature of about 20-25° C. and relative humidity of 50-75%. A 1.0 kN Zwicki (type Z1.0) tension tester from Zwick GmbH, D-89079, Ulm, Germany is used for all measurements. The tensile tester was equipped with a 500 N force transmitter—type 500N-KAP-TC from Zwick GmbH & Co. KG with accuracy of 0.5% for the range 10-500N and 1% for the range of 2N-500N. The sample was mounted in clamps of Type 8190 with a Vulkollan® coating from Zwick GmbH & Co. KG and used in the vertical position. The use of the Type 8190 camps in the vertical position means that the force reduction curve is not used. Compressed air is used to close the clamps at a pressure that is sufficient to prevent the fiber strand from sliding in the clamps and low enough to prevent the fiber strand to be pinched to a point that an indent would create the onset of a premature breaking point. A pressure of 2.0 bar gauge was found to be adequate and was applied to the clamps for the fiber strands analyzed. The gauge length was equal to 2 inch (50.8 mm) and the elongation rate is equal to 2 inch per minutes (50.8 m/min). The elongation at break of the twisted fiber strand was recorded as a percentage elongation of the 2 inch gauge length at the time the sample breaks. Reported data represent an average of at least 10 individual measurements.

Crystallinity Index

The crystallinity index of the polyethylene was measured using X-ray analysis according to the following procedure.

A diffractometer in reflection θ-θ Bragg-Brentano geometry was fitted with a Cu-K$_\alpha$ x-ray tube source with wavelength of 1.54 Å and a 1-dimensional detector. Samples were mounted horizontally on a flat holder at the center of the diffractometer and normal to the scattering vector; during the measurement the sample rotated on this plane.

The method used for the determination of crystallinity index was based on the ratio the scattering intensity of the crystalline regions to the total intensity as described in S. L. Aggarwal, G. P. Tilley, Determination of crystallinity in polyethylene by X-Ray diffractometer, *Journal of Polymer Science*, Vol. 18, pp. 17-26, 1955. The analysis reported in this publication only considers the case in which the orthorhombic phase is present. Additionally, the monoclinic phase may also be present, and in those cases we applied the procedure described below.

1. A local linear background, drawn from 2θ=13±1 to 29±1° in scattering angle, was subtracted.
2. The scattering signal was fitted with four distinct peaks: one associated with the amorphous diffuse scattering (2θ=21.8°, peak width (full width at half height, FWHH) ~4.5 to 5°, with integrated intensity $I_{amorphous}$), two peaks associated with the 110 (2θ=21.59°, $I_{110}$) and 200 (2θ=24.03°, $I_{200}$) reflections of the polyethylene orthorhombic crystal form, and the last peak associated with the 100 (2θ=19.47°, $I_{100}$) reflection of the polyethylene monoclinic crystal form. The quoted angular positions were allowed to vary slightly to account for an expected 2θ shift. The crystalline peaks were ~1° in width (FWHH). Gaussian peaks shapes accounted well for the observed intensities, but Pearson VII peak shapes were also used with good results. Grams Al peak fitting software was used.
3. The total crystallinity index was calculated from the ratio of crystalline to total scattering. The crystalline scattering was defined as the sum of the integrated intensity from the crystalline peaks (monoclinic and orthorhombic). The total scattering was defined as the sum of the integrated intensity of crystalline and amorphous peaks:

$$\text{crystallinity index} = CI_{total} = \frac{I_{110} + I_{200} + I_{100}}{I_{110} + I_{200} + I_{100} + I_{amorphous}} \times 100$$

Accordingly, the partial crystallinity indices $CI_{orthorhombic}$ and $CI_{monoclinic}$ were calculated respectively from these expressions $$CI_{orthorhombic} = \frac{I_{110} + I_{200}}{I_{110} + I_{200} + I_{100} + I_{amorphous}} \times 100$$

$$CI_{monoclinic} = \frac{I_{110}}{I_{110} + I_{200} + I_{100} + I_{amorphous}} \times 100$$

Figure 2:
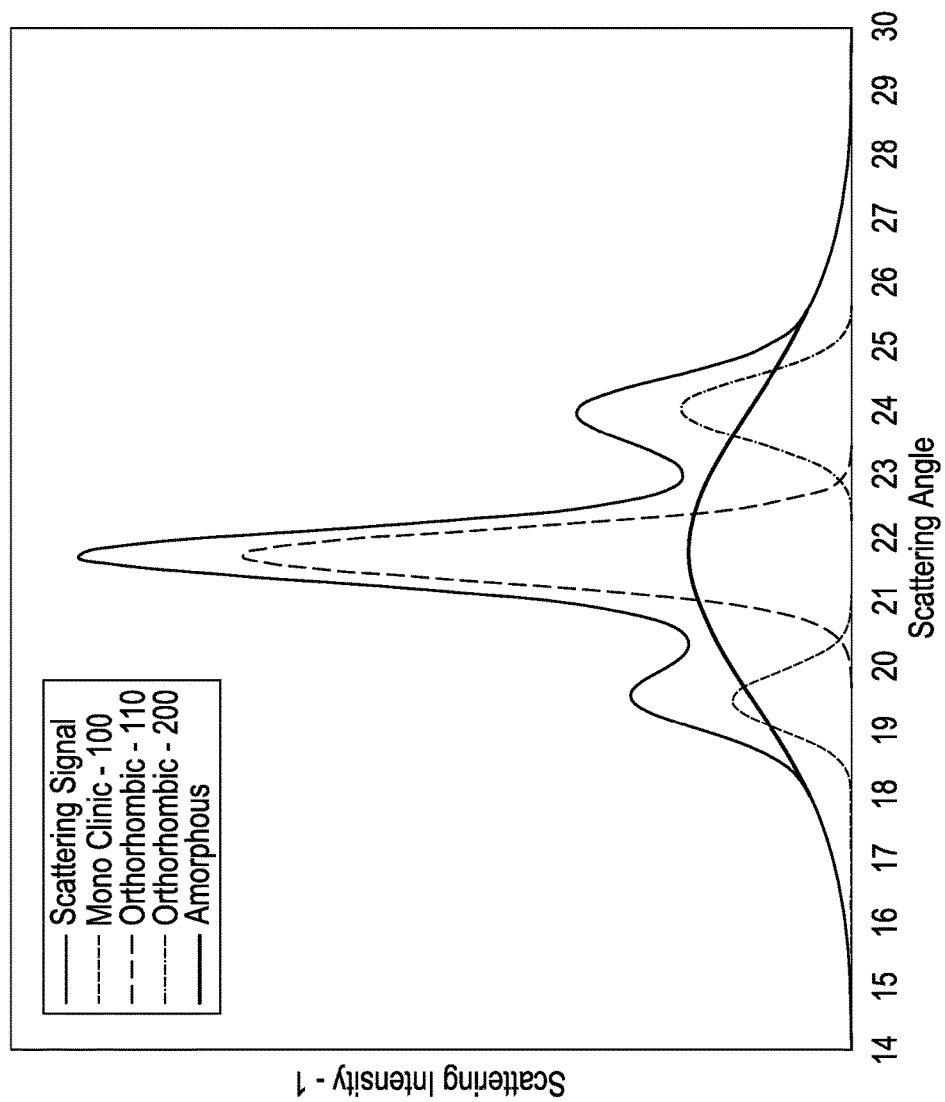
FIG. 2 is an illustration of the X-ray signals from polyethylene with monoclinic and orthorhombic crystal structures.

FIG. 2 is an illustration of the X-ray signals obtained using the X-ray analysis of polyethylene with monoclinic and orthorhombic crystal structure. The various crystalline phases are differentiated by the peak profiles, and, the related apex positions and the heights.

EXPERIMENTAL

The flash spun plexifilamentary fiber strands are generated on a 1 gallon experimental flash spinning unit. The 1 gallon capacity flash spinning apparatus employed herein is a larger version of the 50 cc unit that is described in U.S. Pat. No. 5,147,586. The apparatus consisted of two high-pressure cylindrical chambers, each equipped with a piston that had been adapted to apply pressure to the contents of the chamber through a hydraulic pump. The cylinders each had an internal capacity of 1 gallon. The cylinders were connected to each other to one end by channel with a static mixer. The pistons were driven by high pressure oil supplied by a hydraulic system. The output of one of the cylinders was attached to a chamber that had a spinneret assembly at the other end. The two cylinders are heated to a temperature similar to the desired spin temperature. The polymer is charged into one cylinder. Subsequently a vacuum is pulled on the cylinders. The spin agent is added by a high pressure pump in order to give the desired polymer concentration. The polymer and spin agent were then heated to the desired mixing temperature as measured by a type J thermocouple and held typically at that temperature between 60 and 120 minutes. During heating the pistons were used to alternatively establish a differential pressure between the two cylinders. This action repeatedly forced the polymer and spin agent through the mixing channel from one cylinder to the other to provide mixing and to effect formation of a spin fluid. After mixing and just prior to spinning, the contents were placed completely in one cylinder by moving the other piston to the top of its cylinder. Subsequently a valve is opened to direct the spin fluid to the chamber opening of the spinneret. The flash spun plexifilamentary fiber strand is directed by a baffle onto a moving Reemay®-covered belt in a nitrogen-purged stainless steel enclosure to collect the plexifilamentary fiber strand.

Material Description

Dichloromethane is a technical grade purity from Brenntag Northeast, 81 W. Huller Lane, Reading, Pa. 19605, United states and used as received. Dichloromethane has CAS Nr. 75-09-2. Dichloromethane is also known as methylene chloride.

2,3-dihydrodecafluoropentane is a hydrofluorocarbon with CAS Ni. 138495-42-8 obtained from E.I. DuPont de Nemours and Company, 1007 Market Street, Wilmington Del., United States and used as received.

Trans-1,2-dichloroethylene, is purchased from Diversified CPC International Inc. 24338 W. Durkee Rd. Channahon Ill. 60410-9719, United States and used as received. Trans-1,2-dichloroethylene is also known to as trans-1,2-dichloroethene and has CAS Nr. 156-60-5

HFE 7100 is a commercial grade hydrofluoroether known under the tradename Novec™ 7100 from 3M™ purchased from 3M Center, Building 224-3N-11, St. Paul Minn. 55144-1000. Novec™ 7100 is a mixture of methyl nonafluoroisobutylether, CAS Nr. 163702-08-7 with a contribution of 20-80 wt % and methyl nonafluorobutylether, CAS Nr. 163702-07-6, with a contribution of 20-80 wt %. The purity of Novec™ 7100 is 99.5% and used as received.

1H-perfluorohexane (1,1,1,2,2,3,3,4,4,5,5,6,6-tridecafluorohexane) is a hydrocarbon with CAS Nr. 355-37-3. 1H-perfluorohexane is purchased from Fluoryx Inc., 1933 Davis St. Ste. 294, San Leandro, Calif. 94577, United States. 1H-perfluorohexane has a purity above 98% and used as received.

1H,6H-perfluorohexane (1,1,2,2,3,3,4,4,5,5,6,6-dodecafluorohexane) is a hydrofluorocarbon with CAS Nr. 336-07-2. 1H,6H-perfluorohexane is purchased from Exfluor Research Corporation, 2350 Double Creek Dr., Round Rock, Tex., 78664, United States. 1H,6H-perfluorohexane has a purity level of about 95% and used as received.

The examples 1 and 2 and the comparative examples were spun from a high density polyethylene having a melt index of 2.35 g/10 min (measured according to EN ISO 1133 at 190° C. and 5 kg load), and 24.5 g/10 min (measured according to EN ISO 1133 at 190° C. and 21.6 kg load) a density of 0.96 g/cm$^3$ (measured according to EN ISO 1183). Examples 3 to 6 are spun from a high density polyethylene having a melt index of 0.74 g/10 min (measured according to ASTM D 1238 at 190° C. and 2.16 kg load) and 29.6 g/10 min (measured according to ASTM D 1238 at 190° C. and 21.6 kg load) and density of 0.95 g/cm$^3$.

The sheet of the invention resulted from a flash spinning process conducted from an upstream pressure letdown chamber of at least 15 cm$^3$ and a discharge pressure of 70 bar gauge minimum, yielding a fiber of 200 to 1000 denier.

Results

EXAMPLES

Table 1 summarizes spinning conditions for the examples and table 2 the properties obtained for the examples.

TABLE 1

| | spin fluid | | | spin condition | |
|---|---|---|---|---|---|
| | spinagent media | | composition wt %/ | PE | temperature | pressure |
| Case | 1 | 2 | wt % | wt % | ° C. | barg |
| 1 | DCM | 2,3-dihydrodecafluoropentane | 80.0/20.0 | 10 | 181.5 | 77.4 |
| 2 | DCM | 2,3-dihydrodecafluoropentane | 80.0/20.0 | 12 | 193.8 | 91.3 |
| 3 | DCM | 1H-perfluorohexane | 80.0/20.0 | 12 | 193.4 | 97.9 |
| 4 | DCM | 1H,6H-perfluorohexane | 77.5/22.5 | 10 | 195.3 | 74.0 |
| 5 | DCM | HFE 7100 | 75.0/25.0 | 8 | 192.1 | 129.5 |
| 6 | trans-1,2-DCE | 2,3-dihydrodecafluoropentane | 77.5/22.5 | 10 | 186.6 | 70.9 |
| 7 | trans-1,2-DCE | HFE 7100 | 75.0/25.0 | 8 | 189.2 | 79.4 |
| 8 | DCM | HFE 7100 | 75.0/25.0 | 10 | 192.5 | 127.5 |

TABLE 2

| | fiber property | | crystallinity index | | |
|---|---|---|---|---|---|
| Case | BET m$^2$/g | Crush mm/g | monoclinic $CI_{monoclinic}$ % | orthorhombic $CI_{orthorhombic}$ % | total $CI_{total}$ % |
| 1 | 2.7 | 4.9 | 5.8 | 42.0 | 47.8 |
| 2 | 10.5 | 1.4 | 3.0 | 45.7 | 48.7 |
| 3 | 11.8 | 1.1 | 2.8 | 48.1 | 50.9 |
| 4 | 9.0 | 1.4 | 2.8 | 44.7 | 47.5 |
| 5 | 7.4 | 1.7 | 4.1 | 45.0 | 49.1 |
| 6 | 10.9 | 1.5 | 2.6 | 49.7 | 52.3 |
| 7 | 8.6 | 1.5 | 3.0 | 47.8 | 50.8 |
| 8 | 9.4 | 1.3 | 3.4 | 44.7 | 48.1 |

Table 3 summarizes spinning conditions for the comparative examples and table 4 the properties obtained for the comparative examples.

TABLE 3

| | spin fluid | | | spin condition | |
|---|---|---|---|---|---|
| | spinagent media | | composition wt %/ PE wt % | temperature ° C. | pressure barg |
| Case | 1 | 2 | wt % | | |
| A | n-pentane | Cyclopentane | 75.0/25.0 | 20 | 199.6 | 99.0 |
| B | n-pentane | Cyclopentane | 75.0/25.0 | 20 | 179.3 | 69.4 |
| C | n-pentane | Cyclopentane | 75.0/25.0 | 20 | 211.0 | 113.2 |

TABLE 4

| | fiber property | | crystallinity index | | |
|---|---|---|---|---|---|
| Case | BET $m^2/g$ | crush mm/g | monoclinic $CI_{monoclinic}$ % | orthorhombic $CI_{orthorhombic}$ % | total $CI_{total}$ % |
| A | 14.0 | 1.0 | 0.2 | 61.7 | 61.9 |
| B | 23.1 | 0.6 | 1.0 | 56.7 | 57.7 |
| C | 4.7 | 2.6 | 0.3 | 65.3 | 65.6 |

Table 5 shows the results for elongation at break for both the examples and the comparative examples.

TABLE 5

| Case | Elongation at Break % |
|---|---|
| 1 | 139 |
| 2 | 109 |
| 3 | 93 |
| 4 | 88 |
| 5 | 61 |
| 6 | 86 |
| 7 | 89 |
| 8 | 72 |
| A | 64 |
| B | 84 |
| C | 58 |

A BET surface area of less than or equal to 12 $m^2/g$, a crush value of greater than or equal to 0.9 mm/g, and a crystallinity index of less than or equal to 55%, which is the set of properties that meet the invention objectives, is only reachable under the conditions of spinning and with the compositions described in the examples. None of the comparative examples meet the invention desired set of properties.

Figure 3:
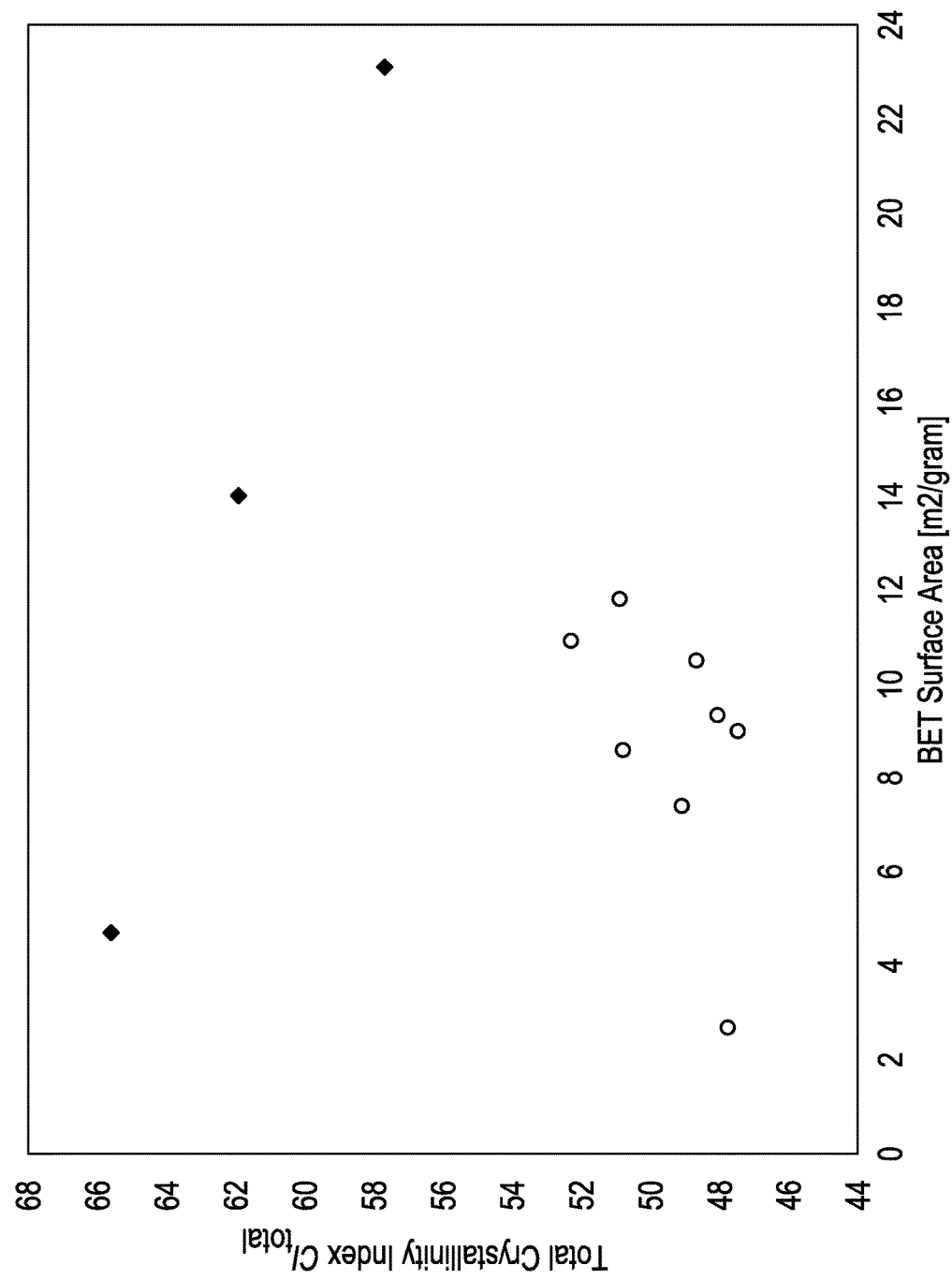
FIG. 3 shows a plot of total crystallinity index v. BET for examples of the invention and comparative examples.

Total crystallinity index ($CI_{total}$) vs BET plots in FIG. 3 for the comparative examples A through C made with hydrocarbon spin agent are shown by the black diamonds in the figure and show a drop in $CI_{total}$ with BET. With the other spin agent systems, cases 1-8 shown as the open circles, FIG. 3 shows an increasing trend in $CI_{total}$ with BET.

Figure 4:
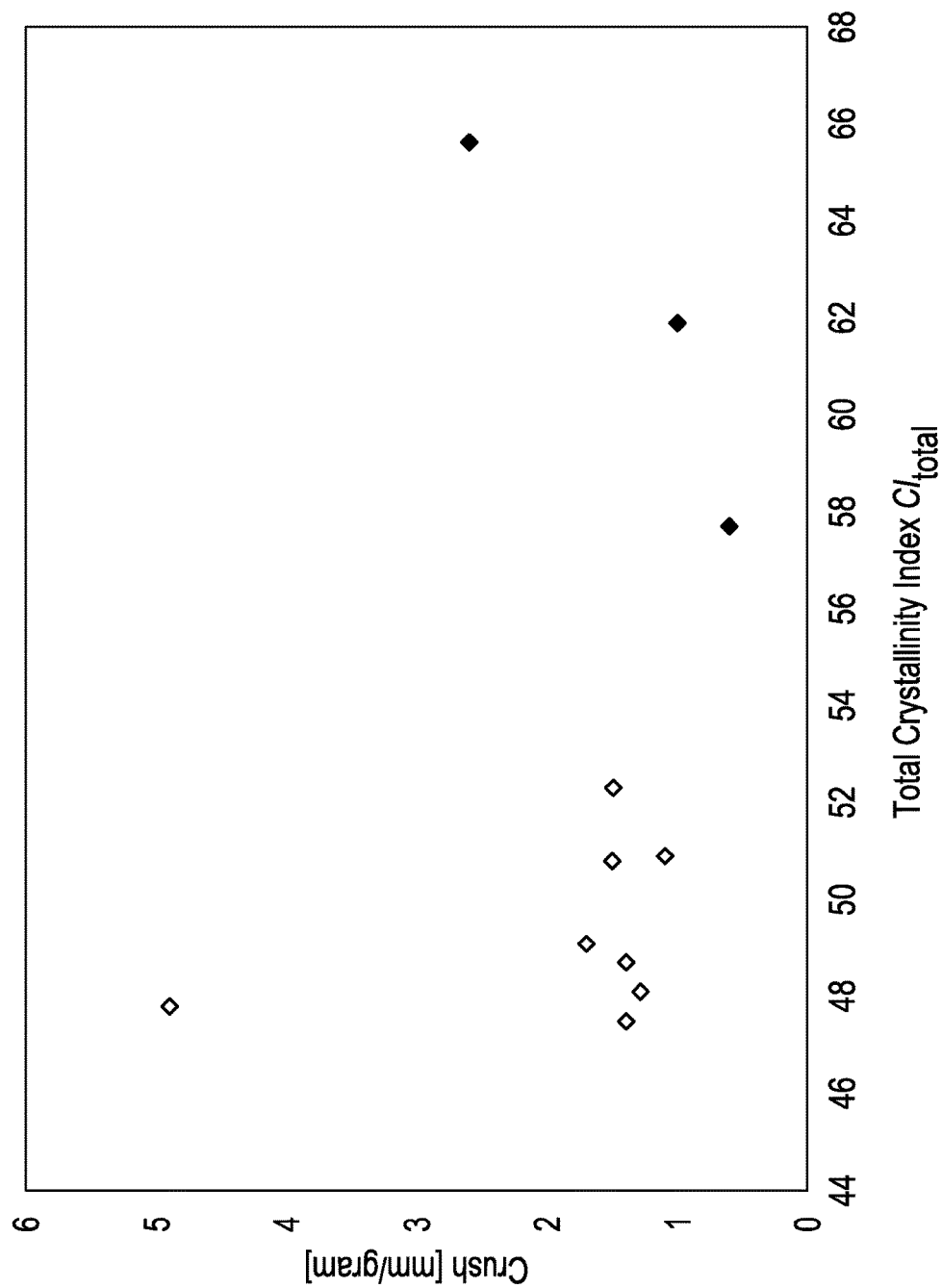
FIG. 4 shows a plot of crush v. total crystallinity index for examples of the invention and comparative examples.

FIG. 4 shows the crush values as a function of the total crystallinity index. For the comparative examples, cases A through C shown as black diamonds, the crush increases with increasing total crystallinity index, whereas for the examples 1-8, open diamonds, crush values above 0.9 mm/gram correspond to a crystallinity index below 55%.

Figure 5:
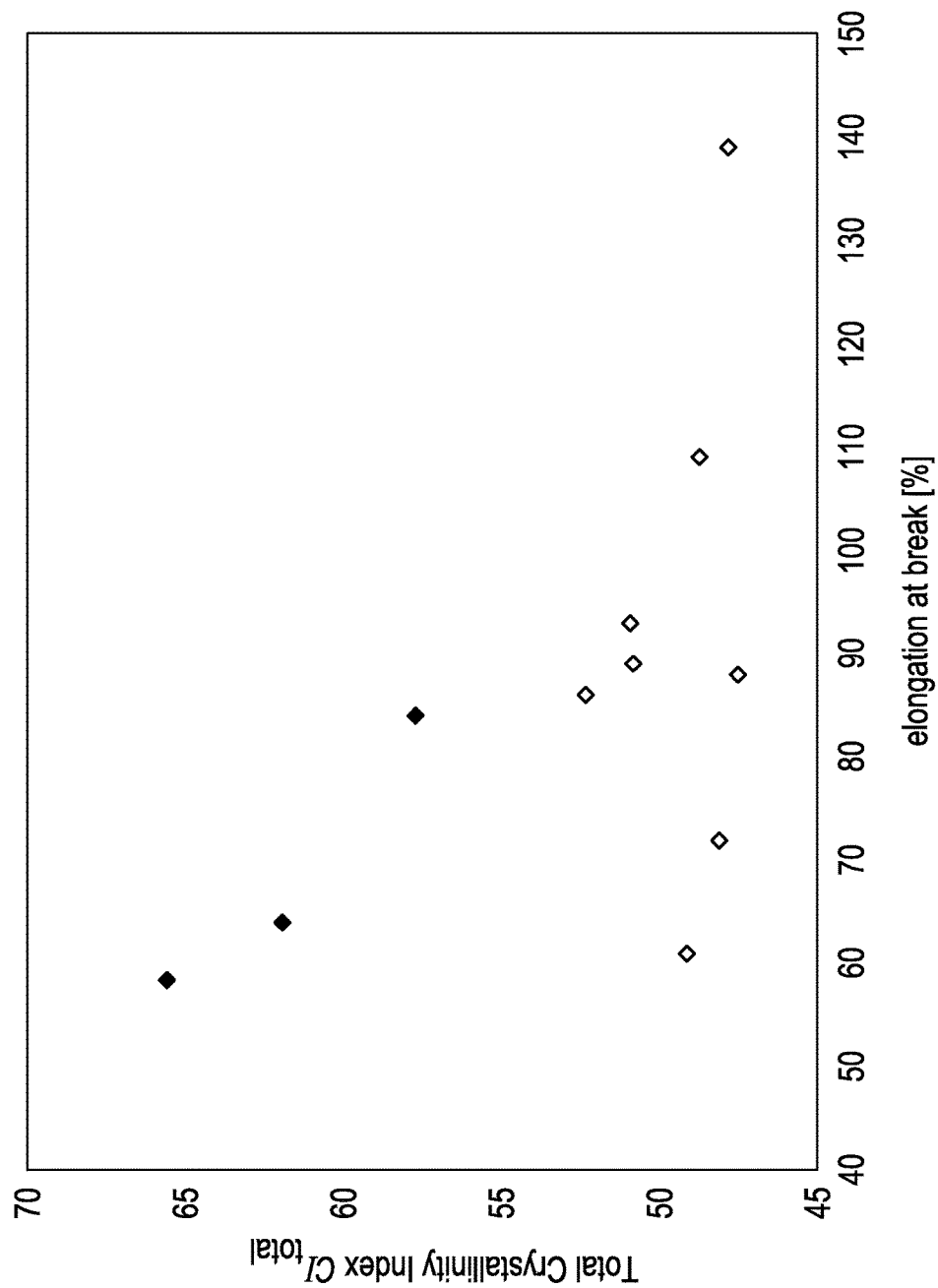
FIG. 5 shows a plot of total crystallinity index v. elongation at break for examples of the invention and comparative examples.

FIG. 5 shows the elongation at break as a function of the crystallinity index. For the comparative examples, cases A through C shown as black diamonds, the total crystallinity index exceeds 55%, whereas the examples 1-8, open diamonds, have an elongation at break values of 55% or greater and a crystallinity index equal or below 55%.

We claim:

1. A thermally or mechanically consolidated sheet comprising a flash-spun plexifilamentary fiber strand comprising fibers having a total crystallinity index of less than or equal to 55%, the flash-spun plexifilamentary fiber strand having a BET surface area of less than or equal to 12 $m^2/g$ and a crush value of greater than or equal to 0.9 mm/g,
    wherein said fiber strand comprises predominantly said fibers, and said fibers are formed from homopolymers of ethylene and have a monoclinic and orthorhombic structure as determined by X-ray characterization and a crystallinity index of the monoclinic structures is higher than 1%,
    wherein the plexifilamentary fiber strand has an elongation at break of 55% or greater, where the elongation at break is measured on a conditioned fiber strand wherein conditioning comprises the steps of (i) hanging a weight of 20-100 gram on one end of the yarn for 3 minutes to remove bends and waviness in the fiber strand and align the film fibrils in the direction of force and (ii) subsequently cutting the conditioned fiber strand into pieces of 30 cm length; and where tensile measurement is performed at a temperature of 20-25° C. and relative humidity of 50-75%, (iii) applying 10 twist per inch under the same weight as during conditioning, (iv) placing the twisted plexifilamentary fiber strand in the clamps of the tensiometer the measurement is made with a gauge length equal to 2 inch (50.8 mm), and the elongation rate is equal to 2 inch per minute equivalent to 50.8 mm per minute;
    the sheet resulting from a flash spinning process utilizing a spin agent medium comprising a mixture of i) and ii), wherein
    i) is dichloromethane or trans-1,2-dichloroethylene; and
    ii) is 2,3-dihydrodecafluoropentane, 1,1,1,2,2,3,3,4,4,5,5,6,6-tridecafluorohexane, 1,1,2,2,3,3,4,4,5,5,6,6-dodecafluorohexane, or a hydrofluoroether.

2. The sheet of claim 1 wherein said fibers have a total crystallinity index of less than or equal to 52%.

3. A multilayer structure comprising a multiplicity of two or more sheets wherein at least one sheet is a sheet according to claim 1.

* * * * *